(12) United States Patent
Pan et al.

(10) Patent No.: US 12,013,565 B1
(45) Date of Patent: Jun. 18, 2024

(54) ILLUMINATED KEYBOARD

(71) Applicant: Primax Electronics Ltd., Taipei (TW)

(72) Inventors: Ding-Hsiang Pan, Taipei (TW); Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/133,717

(22) Filed: Apr. 12, 2023

(51) Int. Cl.
    *H01H 13/83*     (2006.01)
    *F21V 8/00*     (2006.01)

(52) U.S. Cl.
    CPC ................................. *G02B 6/0055* (2013.01)

(58) Field of Classification Search
    CPC .... G02B 6/0055; G02B 6/0011; G02B 6/005; H01H 2219/036; H01H 2219/06; H01H 2219/062; H01H 13/7065; H01H 13/83
See application file for complete search history.

(56) References Cited

U.S. PATENT DOCUMENTS

| | | | |
|---|---|---|---|
| 2015/0212254 A1* | 7/2015 | Sun ........................ | H01H 13/83 362/606 |
| 2019/0148091 A1* | 5/2019 | Pan ...................... | G02B 6/0021 200/5 A |
| 2020/0043681 A1* | 2/2020 | Chen ..................... | G06F 3/0213 |
| 2023/0047235 A1* | 2/2023 | Chen ..................... | G06F 3/0202 |

* cited by examiner

*Primary Examiner* — Abdulmajeed Aziz
*Assistant Examiner* — Jessica M Apenteng
(74) *Attorney, Agent, or Firm* — KIRTON McCONKIE; Evan R. Witt

(57) ABSTRACT

An illuminated keyboard includes a membrane circuit board, a base plate, a key structure, a backlight module and a first reflective layer. The base plate is disposed beneath the membrane circuit board and has a first through hole and a plurality of second through holes adjacent to the first through hole. The key structure is disposed over the membrane circuit board and includes an elastic member. The backlight module is disposed beneath the base plate. The backlight module includes: a direct-type light-emitting element, substantially aligned with the first through hole and misaligned with a trigger portion of the elastic member; and a light guide plate, laterally adjacent to the direct-type light-emitting element. The first reflective layer is disposed over, beneath, or over and beneath the membrane circuit board and is substantially aligned with the first through hole.

13 Claims, 2 Drawing Sheets

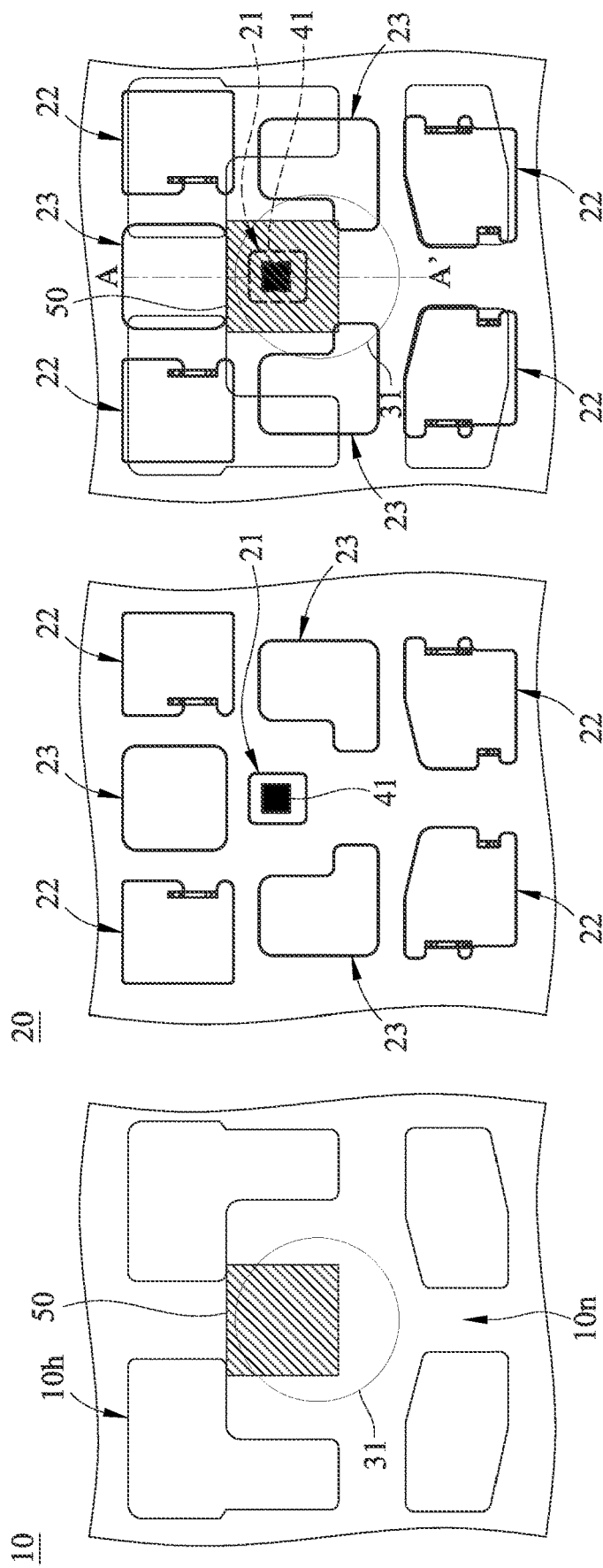

//...

ILLUMINATED KEYBOARD

FIELD OF THE INVENTION

The present disclosure relates to an illuminated keyboard, in particular to a direct-type illuminated keyboard.

BACKGROUND OF THE INVENTION

The keyboard is indispensable equipment for modern people to use computer. The keyboard is provided with many keys for the user to press to input commands. With improvement of keyboards, a keyboard with a backlight module has appeared. When such keyboard is used in an indoor lighting environment, the user can see light projected to the key and generated by the backlight module, thereby having a visual effect.

If it is necessary to control a specific key to emit light, a direct-type illuminated keyboard may be used, but its disadvantage is that light beam of a light-emitting element is mainly projected to a central region of a keycap, resulting in high brightness in the central region of the keycap, and low brightness in a peripheral region of the keycap, and thus a character on the keycap has poor brightness uniformity. Therefore, how to improve the aforementioned situation becomes a technical issue in the art.

SUMMARY OF THE INVENTION

The present disclosure provides an illuminated keyboard, which includes a membrane circuit board, a base plate, a key structure, a backlight module and a first reflective layer. The base plate is disposed beneath the membrane circuit board and has a first through hole and a plurality of second through holes adjacent to the first through hole. The key structure is disposed over the membrane circuit board and includes an elastic member. The backlight module is disposed beneath the base plate. The backlight module includes: a direct-type light-emitting element, substantially aligned with the first through hole and misaligned with a trigger portion of the elastic member; and a light guide plate, laterally adjacent to the direct-type light-emitting element. The first reflective layer is disposed over, beneath, or over and beneath the membrane circuit board and is substantially aligned with the first through hole.

In some embodiments, a vertical projection of the direct-type light-emitting element and a vertical projection of the trigger portion of the elastic member are separated from each other.

In some embodiments, the first through hole and the trigger portion of the elastic member are misaligned with each other.

In some embodiments, a width of the first reflective layer is greater than a width of the first through hole.

In some embodiments, a hook portion is provided on an edge of each of the second through holes, and the second through holes surround the first through hole.

In some embodiments, a vertical projection of the first reflective layer is not overlapped with vertical projections of the second through holes.

In some embodiments, the base plate further has at least one third through hole adjacent to the first through hole and the second through holes, and the at least one third through hole and the second through holes surround the first through hole.

In some embodiments, the light guide plate has a plurality of microstructures substantially aligned with at least one of the second through holes and the at least one third through hole.

In some embodiments, the first reflective layer is a white reflective layer.

In some embodiments, the backlight module further includes a circuit board disposed beneath the direct-type light-emitting element and the light guide plate, and the illuminated keyboard further includes: a second reflection layer, disposed between the light guide plate and the circuit board.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

FIG. 1 is a schematic top view of a membrane circuit board, an elastic member and a first reflective layer according to some embodiments of the present invention.

FIG. 2 is a schematic top view of a base plate and a direct-type light-emitting element according to some embodiments of the present invention.

FIG. 3 is a schematic top view of a membrane circuit board, an elastic member, a first reflective layer, a base plate and a direct-type light-emitting element according to some embodiments of the present invention.

DETAIL DESCRIPTION OF THE PREFERRED EMBODIMENT

Figure 4:
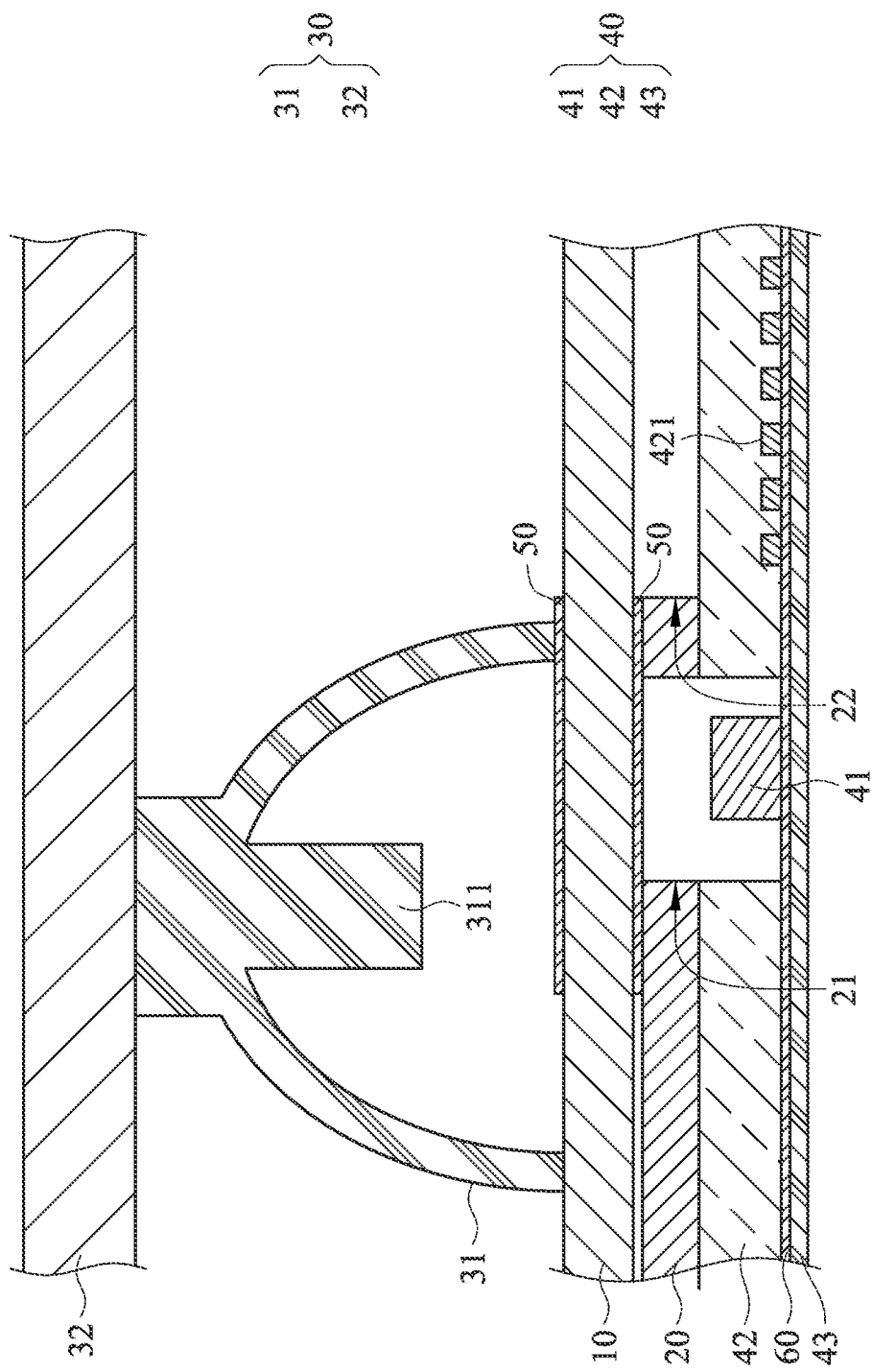
FIG. 4 is a schematic cross-sectional view of an illuminated keyboard taken along a section line A-A' of FIG. 3.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, for the direct-type illuminated keyboard, its disadvantage is that the light beam of the light-emitting element is mainly projected to the central region of the keycap, resulting in high brightness in the central region of the keycap, and low brightness in the peripheral region of the keycap, and thus the character on the keycap has poor brightness uniformity. How to improve the aforementioned situation becomes a technical issue in the art. Accordingly, the present invention provides an illuminated keyboard, which includes a membrane circuit board, a base plate, a key structure including an elastic member, a backlight module including a direct-type light-emitting element and a light guide plate, and a first reflective layer, in which the direct-type light-emitting element is substantially aligned with a first through hole of the base plate and is misaligned with a trigger portion of the elastic member, and the first reflective layer is disposed over, beneath or over and beneath the membrane circuit board and is substantially aligned with the first through hole, so that light beam of the direct-type light-emitting element is projected onto and then reflected by the first reflective layer, and then enters the light guide plate, and then exits, which can reduce the brightness in the central region of the keycap and increase the brightness in the peripheral region of the keycap, so that the character on the keycap of the present invention has good brightness uniformity. Various embodiments of the illuminated keyboard of the present invention will be described in detail below.

FIG. 1 is a schematic top view of a membrane circuit board, an elastic member and a first reflective layer according to some embodiments of the present invention. FIG. 2 is a schematic top view of a base plate and a direct-type light-emitting element according to some embodiments of the present invention. FIG. 3 is a schematic top view of a membrane circuit board, an elastic member, a first reflective layer, a base plate and a direct-type light-emitting element according to some embodiments of the present invention. FIG. 4 is a schematic cross-sectional view of an illuminated keyboard taken along a section line A-A' of FIG. 3.

Please refer to FIG. 4, the illuminated keyboard includes a membrane circuit board 10, a base plate 20, a key structure 30, a backlight module 40 and a first reflective layer 50.

In some embodiments, as shown in FIG. 1, the membrane circuit board 10 has a perforated region 10h and a non-perforated region 10n, and the perforated region 10h and an unwired region of the non-perforated region 10n can allow light to pass through. In some embodiments, the membrane circuit board 10 may include a plurality of transparent membranes (not shown) stacked on each other. In some embodiments, the membranes include an upper transparent membrane (not shown) and a lower transparent membrane (not shown), and a lower surface of the upper transparent membrane has a first circuit pattern, and the first circuit pattern has an upper contact, and an upper surface of the lower transparent membrane has a second circuit pattern, and the second circuit pattern has a lower contact. The upper contact and the corresponding lower contact jointly form a membrane switch. In some embodiments, the membranes further include a middle transparent membrane (not shown), which is disposed between the upper transparent membrane and the lower transparent membrane.

As shown in FIG. 4, the base plate 20 is disposed beneath the membrane circuit board 10. As shown in FIGS. 2 to 4, the base plate 20 has a first through hole 21 and a plurality of second through holes 22 adjacent to the first through hole 21. In some embodiments, a hook portion (not marked) is provided on an edge of each of the second through holes 22, and the second through holes 22 surround the first through hole 21.

In some embodiments, the base plate 20 further includes at least one third through hole 23 adjacent to the first through hole 21 and the second through holes 22, and the at least one third through hole 23 and the second through holes 22 surround the first through hole 21. In some embodiments, a hook portion is not provided on an edge of the at least one third through hole 23. In some embodiments, the third through hole 23 is configured to provide a light-permeable region.

As shown in FIG. 4, the key structure 30 is disposed over the membrane circuit board 10. The key structure 30 includes an elastic member 31. In some embodiments, the key structure 30 further includes a keycap 32 disposed over the elastic member 31. In some embodiments, the key structure further includes a scissor-type connecting element (not shown), which is disposed between the keycap 32 and the base plate 20, and corresponds to the hook portions of the second through holes 22. In some embodiments, the keycap 32 has four connecting portions (not shown), such as two hook parts and two slide grooves, and the four connecting portions are configured to connect four portions of the scissor-type connecting element, respectively; as shown in FIGS. 2 and 3, the edge of each of the second through holes 22 of the base plate 20 is provided with the hook portion (not marked), and the four hook portions are configured to connect another four portions of the scissors-type connecting element, respectively. As such, when the key structure 30 is in operation, the scissor-type connecting element will not detach from the keycap 32 and the base plate 20. In some embodiments, the perforated region 10h of the membrane circuit board 10 is provided in cooperation with the scissors-type connection element.

As shown in FIG. 4, the backlight module 40 is disposed beneath the base plate 20. The backlight module includes a direct-type light-emitting element 41 and a light guide plate 42. Light beam of the direct-type light-emitting element 41 projects directly upward, so the direct-type light-emitting element 41 may also be called a top-view type light-emitting element. As shown in FIGS. 3 and 4, the direct-type light-emitting element 41 is substantially aligned with the first through hole 21 and is misaligned with a trigger portion 311 of the elastic member 31. In some embodiments, as shown in FIG. 4, a vertical projection of the direct-type light-emitting element 41 and a vertical projection of the trigger portion 311 of the elastic member 31 are separated from each other.

It is worth noting that a contact region of the membrane circuit board 10 is directly beneath the trigger portion 311, and therefore, if the trigger portion 311 is substantially aligned with the first through hole (e.g., a vertical projection of the trigger portion 311 is in a vertical projection of the first through hole), the contact region of the membrane circuit board 10 fails to be supported by the base plate, resulting in reducing a service life of the contact region of the membrane circuit board 10. Therefore, in some embodiments, the first through hole 21 and the trigger portion 311 are misaligned with each other (e.g., the vertical projection of the first through hole 21 and the vertical projection of the trigger portion 311 are partially overlapped with or separated from each other), and the direct-type light emitting element 41 and the trigger portion 311 are also misaligned with each other (e.g., the vertical projection of the direct-type light emitting element 41 and the vertical projection of the trigger portion 311 are partially overlapped with or are separated from each other), so that the contact region of the membrane circuit board 10 can have a better service life.

As shown in FIG. 4, the light guide plate 42 is laterally adjacent to the direct-type light emitting element 41. In some embodiments, as shown in FIGS. 2 and 4, the light guide plate 42 has a plurality of microstructures (or dots) 421 substantially aligned with at least one of the second through holes 22 and the at least one third through hole 23. The microstructures 421 can guide light to travel in a desired direction. In some embodiments, when light in the light guide plate 42 touches the microstructures 421, the microstructures 421 can guide the light upward, so that the light passes through the second through holes 22 and/or the at least one third through hole 23, and then passes through the perforated region 10*h* and the unwired region of the non-perforated region 10*n* to reach the peripheral region of the keycap 32, so as to enhance the brightness in the peripheral region of the keycap 32.

In some embodiments, the backlight module 40 further includes a circuit board 43 disposed beneath the direct-type light-emitting element 41 and the light guide plate 42. The circuit board 43 may be, for example, a printed circuit board (PCB) or a flexible circuit board (FPC).

The first reflective layer 50 is disposed over, beneath or over and beneath the membrane circuit board 10 (FIG. 4 shows the situation where the first reflective layer 50 is disposed over and beneath the membrane circuit board 10) and is substantially aligned with the first through hole 21. In some embodiments, the first reflective layer 50 is only disposed beneath the membrane circuit board 10 to avoid affecting the operation of the contact region of the membrane circuit board 10. In some embodiments, a width of the first reflective layer 50 is greater than a width of the first through hole 21. The first reflective layer 50 is configured to reduce the brightness in the central region of the keycap 32 and help the light enter the light guide plate 42. In some embodiments, a vertical projection of the first reflective layer 50 is not overlapped with vertical projections of the second through holes 22. In some embodiments, the first reflective layer 50 is a white reflective layer. In some embodiments, the illuminated keyboard further includes a second reflective layer 60 disposed between the light guide plate 42 and the circuit board 43.

In some embodiments, the first reflective layer 50 is a reflective coating, which is directly attached (e.g., formed by spraying or another suitable coating method) to a portion of an upper surface of the membrane circuit board 10 and/or a portion of a lower surface thereof, and its optical reflection effect is better than an optical reflection effect of a general reflective sheet adhered through an adhesive layer. In some embodiments, a thickness of the reflective coating may be less than or equal to 20 microns, or even less than or equal to 15 microns or 10 microns, so it is helpful to reduce an overall thickness of the illuminated keyboard without affecting the assembly between the elastic member 31 and the membrane circuit board 10 and/or the assembly between the membrane circuit board 10 and the base plate 20. In some embodiments, the second reflective layer 60 is a reflective coating, which is also helpful for reducing the overall thickness of the illuminated keyboard.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:
1. An illuminated keyboard, comprising:
   a membrane circuit board;
   a base plate, disposed beneath the membrane circuit board, and the base plate having a first through hole and a plurality of second through holes adjacent to the first through hole;
   a key structure, disposed over the membrane circuit board, and including an elastic member and a keycap disposed over the elastic member;
   a backlight module, disposed beneath the base plate, and the backlight module comprising:
      a direct-type light-emitting element, substantially aligned with the first through hole of the base plate and misaligned with a trigger portion of the elastic member, wherein the direct-type light-emitting element is configured to project a light beam directly upward; and
      a light guide plate, laterally adjacent to the direct-type light-emitting element; and
   a first reflective layer, disposed over the direct-type light-emitting element, and disposed over, beneath, or over and beneath the membrane circuit board, and substantially aligned with and disposed on the first through hole of the base plate, wherein the first reflective layer fully covers the first through hole of the base plate and a top surface of the direct-type light-emitting element to reduce brightness in a central region of the keycap and to reflect the light beam to the light guide plate.

2. The illuminated keyboard of claim 1, wherein a vertical projection of the direct-type light-emitting element and a vertical projection of the trigger portion of the elastic member are separated from each other.

3. The illuminated keyboard of claim 1, wherein the first through hole and the trigger portion of the elastic member are misaligned with each other.

4. The illuminated keyboard of claim 3, wherein a vertical projection of the first through hole of the base plate is overlapped with a vertical projection of the elastic member.

5. The illuminated keyboard of claim 3, wherein a vertical projection of the first through hole of the base plate falls in a vertical projection of the elastic member.

6. The illuminated keyboard of claim 1, wherein a width of the first reflective layer is greater than a width of the first through hole.

7. The illuminated keyboard of claim 1, wherein a hook portion is provided on an edge of each of the second through holes, and the second through holes surround the first through hole.

8. The illuminated keyboard of claim 7, wherein a vertical projection of the first reflective layer is not overlapped with vertical projections of the second through holes.

9. The illuminated keyboard of claim 7, wherein the base plate further has at least one third through hole adjacent to the first through hole and the second through holes, and the at least one third through hole and the second through holes surround the first through hole.

10. The illuminated keyboard of claim 9, wherein the light guide plate has a plurality of microstructures substantially aligned with at least one of the second through holes and the at least one third through hole.

11. The illuminated keyboard of claim 1, wherein the first reflective layer is a white reflective layer.

12. The illuminated keyboard of claim 1, wherein the backlight module further comprises a circuit board disposed beneath the direct-type light-emitting element and the light guide plate, and the illuminated keyboard further comprises:
   a second reflection layer, disposed between the light guide plate and the circuit board.

13. The illuminated keyboard of claim 1, wherein the light guide plate has an opening for accommodating the direct-type light-emitting element and substantially aligned with the first through hole of the base plate.

* * * * *